Patented Nov. 22, 1932

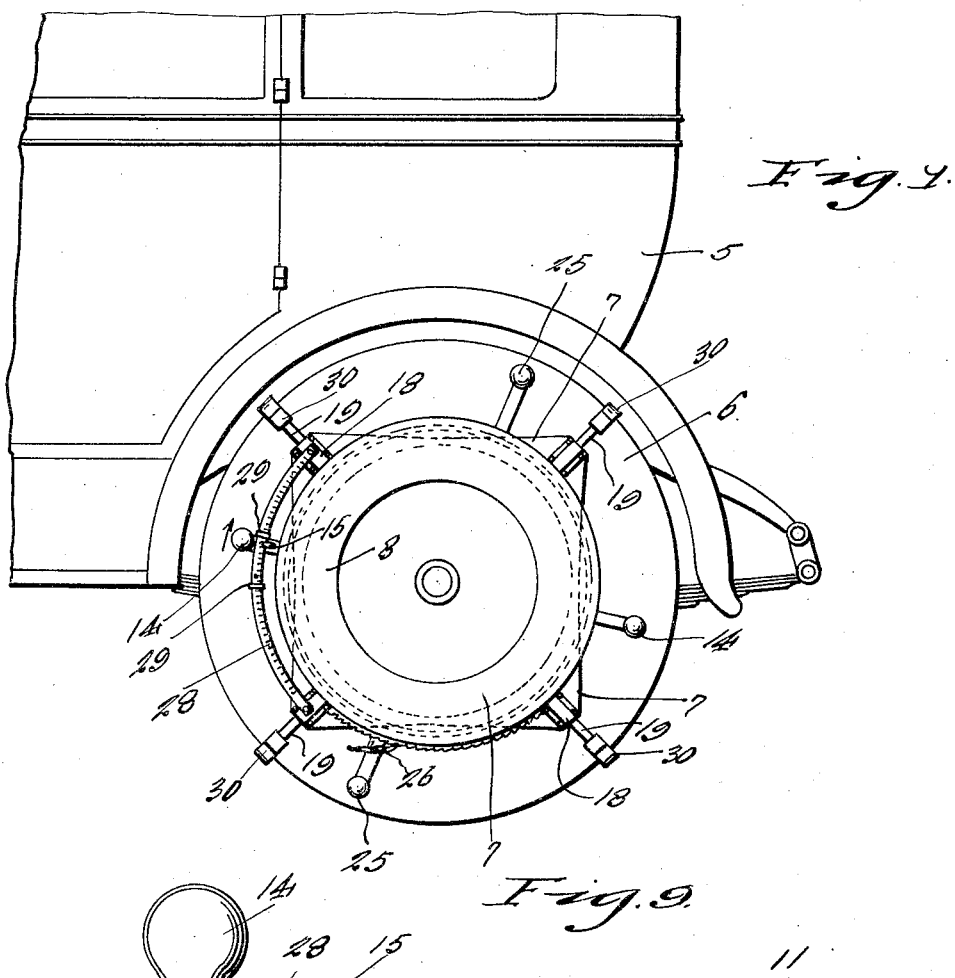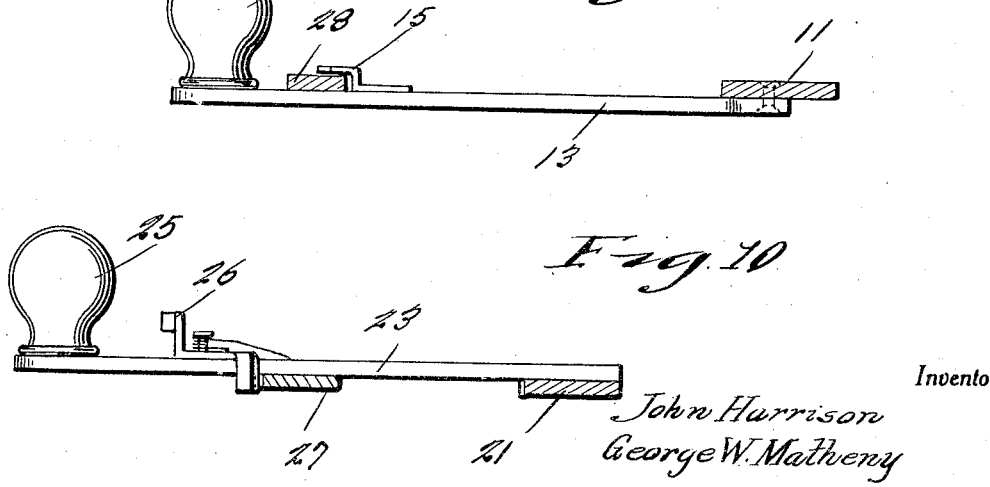

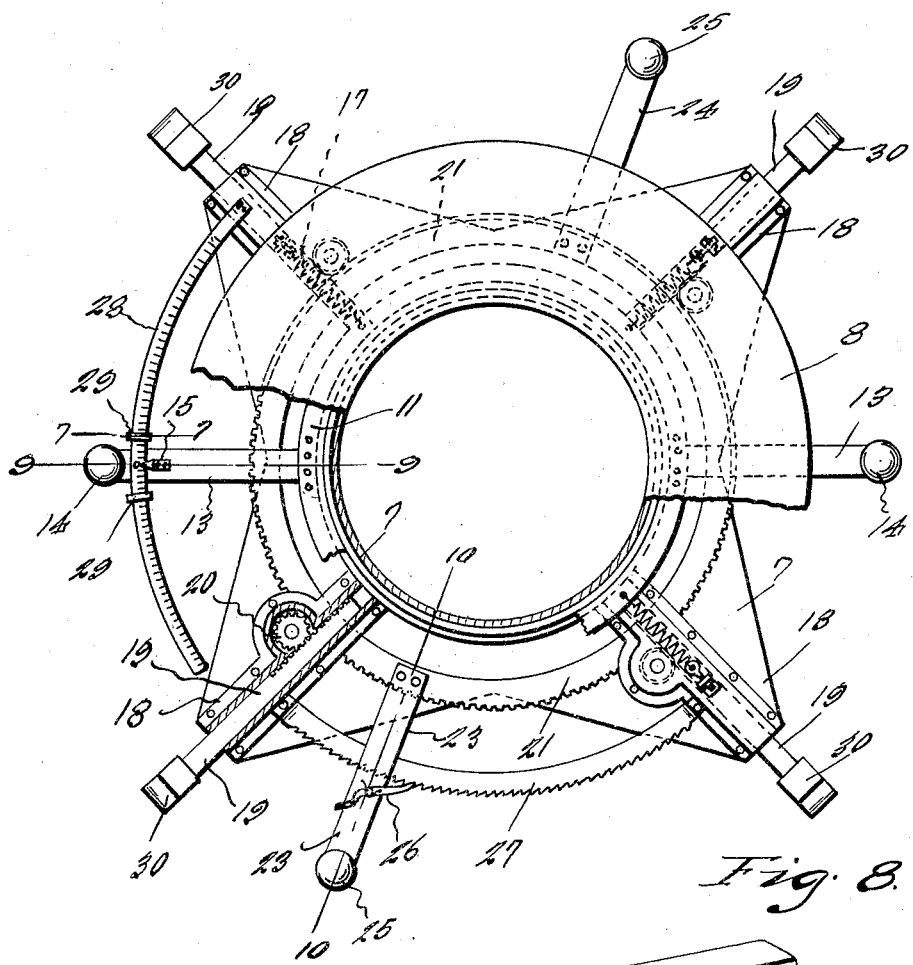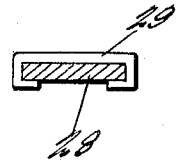

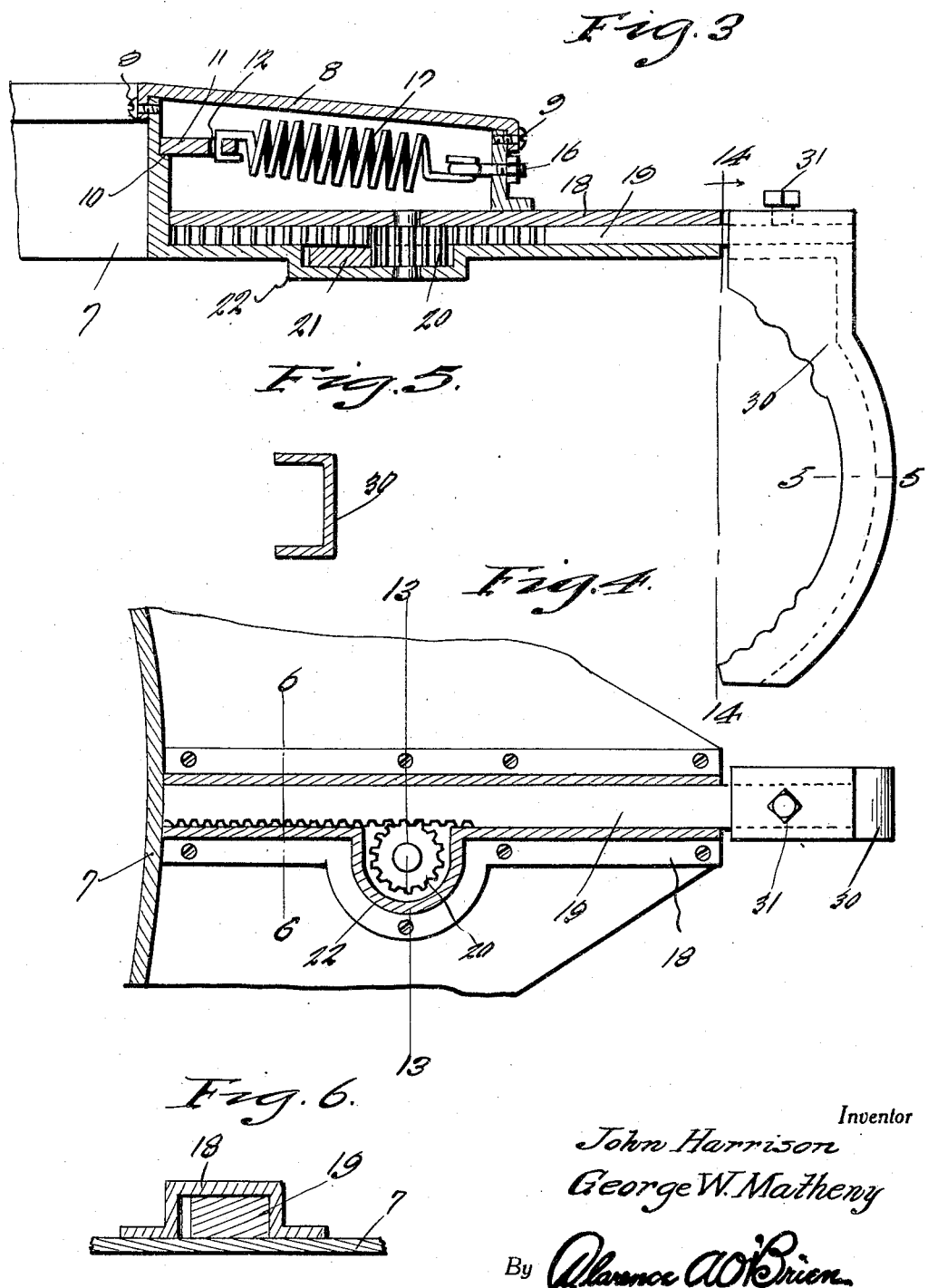

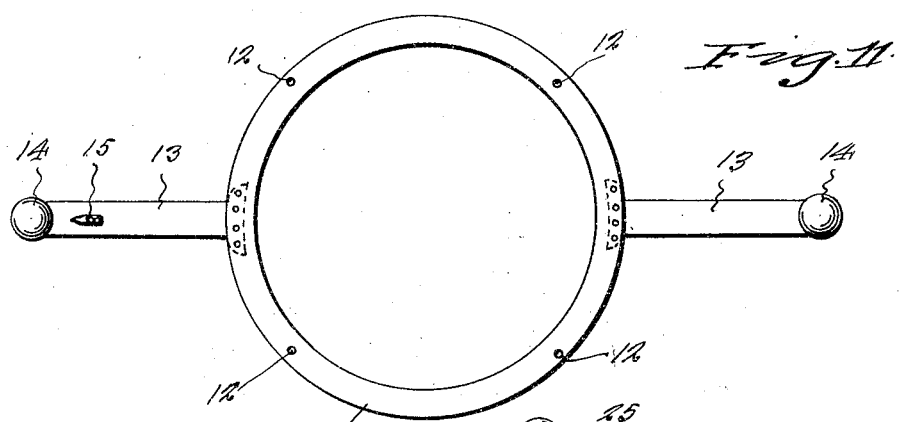
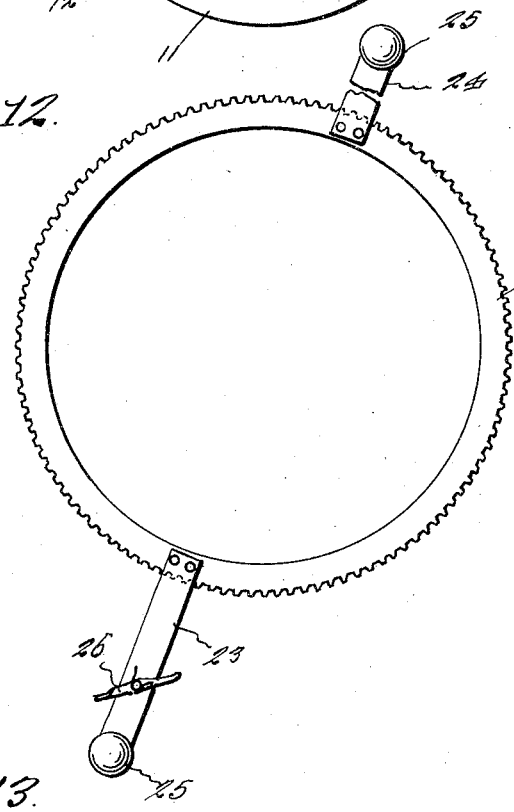
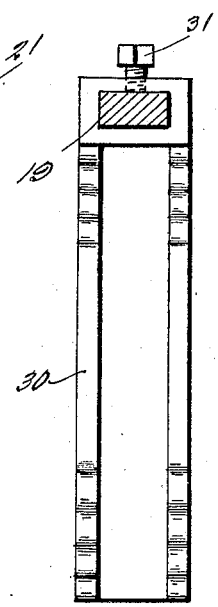
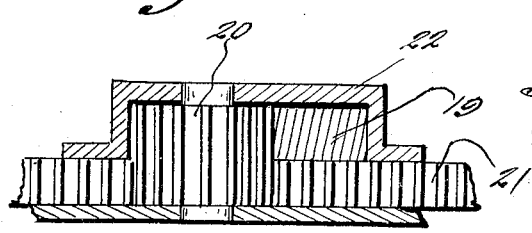

1,888,858

UNITED STATES PATENT OFFICE

JOHN HARRISON AND GEORGE W. MATHENY, OF CALDWELL, OHIO

BRAKE TESTING MECHANISM

Application filed August 30, 1930. Serial No. 478,914.

This invention relates to new and useful improvements in means for testing the brakes of automobiles in a quick and efficient manner.

The principal object of the invention is to provide a portable brake testing mechanism which can be quickly applied to a vehicle wheel and operated in a convenient and easy manner.

These and other important objects and advantages of the invention will readily become apparent to the reader of the following specification and claim.

In the drawings:—

Figure 1 represents a front elevational view of the device applied to a wheel.

Fig. 2 represents a fragmentary detail sectional view disclosing the details of the mechanism.

Fig. 3 is a fragmentary detail sectional view disclosing one of the extensible tire engaging units.

Fig. 4 represents a horizontal sectional view through the structure shown in Fig. 3.

Fig. 5 represents a sectional view taken substantially on the line 5—5 of Fig. 3.

Fig. 6 represents a sectional view taken substantially on the line 6—6 of Fig. 4.

Fig. 7 represents a sectional view taken substantially on the line 7—7 of Fig. 2.

Fig. 8 is a perspective of a marker embodied in the invention.

Fig. 9 represents a sectional view taken substantially on the line 9—9 of Fig. 2.

Fig. 10 represents a sectional view taken substantially on the line 10—10 of Fig. 2.

Fig. 11 is a side elevation of an annulus and arms therefor embodied in the invention.

Fig. 12 is a side elevation of a ring gear and associated arms embodied in the invention.

Fig. 13 represents a sectional view taken substantially on the line 13—13 of Fig. 4.

Fig. 14 represents a sectional view taken substantially on the line 14—14 of Fig. 3.

Referring to the drawings wherein like numerals designate like parts, it can be seen that numeral 5 represents the body of an automobile, while numeral 6 represents a tire on one of the rear wheels of the automobile.

In carrying out the present invention an annular housing 7 is provided with a circular plate 8, adapted to be secured to the housing 7 by screws 9 or in fact any other suitable means. The interior of the housing 7 has a circumferentially extending shoulder 10 on which the annulus 11 rides. This annulus 11 (as shown in Fig. 11) has a plurality of openings 12 at circumferentially spaced intervals. Projecting outwardly at diametrically opposite points on the annulus 11 are the arms 13—13, each being provided with an upstanding knob or handle.

It can be seen that one of the arms 13 has a pointer 15 suitably secured thereto. Eye bolts 16 extend through the outer wall of the housing 7 with their eye ends protruding into the housing. Engageable with each of the eye bolts 16 is one end of a coiled spring 17, which has its opposite end through the opening 12 in the annulus 11.

Thus the annulus 11 is normally maintained in a set position by the springs 17. Adjacent each spring 17, a barrel 18 projects radially from the housing 7. The barrel 18 has a rack 19 slidable therein and this rack 19 meshes with a gear 20, the gear 20 being meshed with the ring gear 21, which is operative through the well 22 in the gears 20. As is clearly shown in Fig. 12, this ring gear 21 has a pair of arms 23—24 projecting outwardly therefrom at diametrically opposite points thereon. Each of these arms is provided with an outstanding knob or handle 25, while the arm 23 is provided with a spring tensioned pawl 26.

It can be seen in Fig. 2 that a ratchet bar 27 of arcuate shape is interposed between a pair of the barrels 18 so as to be engageable by the pawl 26.

An elongated longitudinally curved gauge bar 28 is secured at one end to one of the barrels 18 and has marking elements 29 movable thereon and disposed in the path of travel of the pointer 15 thereon. This gauge bar is disposed under the pointer 15 on the corresponding arm 13 and as can be observed in Fig. 2, this gauge bar has suitable graduations thereon.

By now referring to Fig. 3 and also Fig. 14, it can be seen that an arcuate-shaped channel member is provided for each of the rack bars 19, the same having its inner end provided with a socket for receiving the outer end of the corresponding rack bar. A set screw 31 is provided for each channel 30, whereby it can be securely fastened to its corresponding rack bar 19.

It can now be seen that in swinging the arms 23 and 24 in a counterclockwise direction after releasing the pawl 26, the ring gear 21 will operate the gears 20 so as to drive the rack bars 19 outwardly, so that the channel members 30 can be engaged over the tire 6. When the channel members have been so engaged with the tire the arms 23 and 24 are swung in a clockwise direction. This results in the snug engagement of the members 30 with the tread portion of the tire 6 and at this point the pawl 26 can be released so that it will engage with the ratchet bar 27. Thus the mechanism will remain on the wheel against accidental displacement.

The test is to ascertain which of the two rear wheels, (or in fact the front wheels also) can be rotated with the least exertion which will register on the gauge bar 28 in the manner presently described.

By now grasping the knobs 14—14 and moving the same in a clockwise direction, the spring 17 will be flexed and when sufficient tension has been exerted on the bar 11 so as to overcome the braking action of the brake on this particular wheel, the wheel will rotate and the result will be indicated by the movement of the pointer 15 along the arcuate gauge bar 28. The markers 29 will serve to make a temporary record of this. By applying and operating the mechanism on the opposite wheel of the vehicle, and also noting where the pointer 15 is located on the gauge bar 28 when the wheel begins to rotate, the unbalanced relation of the brake can be readily ascertained to permit the proper adjustment thereof.

While the foregoing specification sets forth the invention in specific terms, it is to be understood that numerous changes in the shape, size and materials may be resorted to without departing from the spirit and scope of the invention as claimed hereinafter.

Having thus described our invention what we claim as new is:—

A brake testing mechanism for wheels comprising a body, clamp devices on the body for engaging the wheel, manually operated means for operating the clamp device, means for ascertaining the force that must be exerted in order to turn the wheel against a given application of the brake including spring means connecting said latter means to the clamp devices, said manual means comprising a ring gear, rack teeth on the devices, a gear meshing with the teeth of each clamp device and also with the ring gear, a lever projecting from the ring gear, and ratchet and pawl means whereby the ring gear can be retained in a given position.

In testimony whereof we affix our signatures.

JOHN HARRISON.
GEORGE W. MATHENY.